US008791787B2

(12) United States Patent
Hardacker et al.

(10) Patent No.: US 8,791,787 B2
(45) Date of Patent: Jul. 29, 2014

(54) USER PERSONALIZATION WITH BEZEL-DISPLAYED IDENTIFICATION

(75) Inventors: Robert L. Hardacker, Escondido, CA (US); Steven Richman, San Diego, CA (US); Rafael Calderon, San Diego, CA (US); Fred J. Zustak, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 631 days.

(21) Appl. No.: 12/653,347

(22) Filed: Dec. 11, 2009

(65) Prior Publication Data

US 2011/0140840 A1 Jun. 16, 2011

(51) Int. Cl.
*G05B 19/00* (2006.01)
*H04N 21/485* (2011.01)
*H04N 21/4415* (2011.01)
*H04N 21/475* (2011.01)
*H04N 5/66* (2006.01)

(52) U.S. Cl.
CPC ............. *H04N 5/66* (2013.01); *H04N 21/4854* (2013.01); *H04N 21/4415* (2013.01); *H04N 21/4753* (2013.01)
USPC ........... 340/5.1; 340/5.2; 340/5.53; 340/5.74; 340/5.8; 340/5.81; 340/5.83; 348/52; 348/207.99; 386/261; 725/25

(58) Field of Classification Search
CPC .......... H04N 21/258; H04N 21/25866; H04N 21/25875; H04N 21/25883; H04N 21/25891; H04N 21/40; H04N 21/47; H04N 21/475; H04N 21/4751; H04N 21/4753; H04N 21/4755; H04N 21/4756; H04N 21/485; H04N 21/4852
USPC ........ 725/9–21, 37, 43; 348/563, 42–60, 150; 345/1.1–6
See application file for complete search history.

(56) References Cited

U.S. PATENT DOCUMENTS 5,497,185 A * 3/1996 Dufresne et al. ................. 725/11
5,659,366 A * 8/1997 Kerman .......................... 725/34
(Continued)

FOREIGN PATENT DOCUMENTS

JP    2007-184772 A    7/2007
KR   10-2009-0121504   11/2009
(Continued)

OTHER PUBLICATIONS

Korean Office Action, Corresponding KR Application No. 10-2012-7013535, Jun. 24, 2013, Received Jul. 10, 2013.
(Continued)

*Primary Examiner* — Steven Lim
*Assistant Examiner* — Ryan Sherwin
(74) *Attorney, Agent, or Firm* — Miller Patent Services; Jerry A. Miller

(57) ABSTRACT

An identity of a person proximate to a display device is determined by an identity profile controller. The identity profile controller determines whether a configured viewing profile exists for the person. Upon determining that the configured viewing profile exists for the person, the identity profile controller instructs a bezel display controller to display a profile identifier associated with the configured viewing profile via a two-dimensional light-emitting diode (LED) array located within a bezel of the display device outside of the display area of the display. The identity profile controller automatically adjusts display device settings for the display device based upon the configured viewing profile. This abstract is not to be considered limiting, since other embodiments may deviate from the features described in this abstract.

46 Claims, 6 Drawing Sheets

(56) References Cited

U.S. PATENT DOCUMENTS

| | | | |
|---|---|---|---|
| 5,682,486 A | 10/1997 | Grossman et al. | |
| 5,702,305 A | 12/1997 | Norman et al. | |
| 5,889,506 A | 3/1999 | Lopresti et al. | |
| 6,359,661 B1* | 3/2002 | Nickum | 348/734 |
| 6,839,072 B2* | 1/2005 | Trajkovic et al. | 715/811 |
| 7,260,823 B2* | 8/2007 | Schlack et al. | 725/9 |
| 7,373,605 B2* | 5/2008 | Schaper | 715/730 |
| 8,539,357 B2* | 9/2013 | Hildreth | 715/745 |
| 2002/0059107 A1 | 5/2002 | Reich et al. | |
| 2003/0046557 A1 | 3/2003 | Miller et al. | |
| 2003/0063222 A1* | 4/2003 | Creed et al. | 348/687 |
| 2006/0174266 A1 | 8/2006 | Gatto et al. | |
| 2006/0280443 A1* | 12/2006 | Horii | 386/95 |
| 2007/0126884 A1 | 6/2007 | Xu et al. | |
| 2007/0201824 A1* | 8/2007 | Masaki et al. | 386/83 |
| 2008/0001951 A1 | 1/2008 | Marks et al. | |
| 2008/0036914 A1 | 2/2008 | Russ et al. | |
| 2008/0278635 A1* | 11/2008 | Hardacker et al. | 348/734 |
| 2009/0138907 A1* | 5/2009 | Wiser et al. | 725/34 |
| 2011/0018849 A1* | 1/2011 | Lowe et al. | 345/205 |

FOREIGN PATENT DOCUMENTS

| | | |
|---|---|---|
| WO | WO 01/24524 | 4/2001 |
| WO | WO 2008/002759 | 1/2008 |
| WO | WO2009/061952 | 5/2009 |
| WO | WO 2009-067670 | 5/2009 |

OTHER PUBLICATIONS

Office Action, corresponding Japanese Patent Application No. 2012-540091 (and translation), Aug. 14, 2013, Received Sep. 20, 2013.
Chinese Office action in foreign counterpart application and translation thereof dated Dec. 4, 2013.

* cited by examiner

USER PERSONALIZATION WITH BEZEL-DISPLAYED IDENTIFICATION

CROSS REFERENCE TO RELATED DOCUMENTS

This application is related to concurrently filed U.S. utility patent application Ser. No. 12/653,348 titled "ILLUMINATED BEZEL INFORMATION DISPLAY," which is incorporated herein by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Television and other display devices include display units that allow these devices to render visual content. These display units are typically surrounded by a framed enclosure that surrounds the display unit and that protects electronic circuitry and mechanical components associated with the respective display device from impact and other environmental factors. The framed enclosures are often formed from plastic, metal, or other material that provides mechanical rigidity to the display device and that allows the display device to be moved, installed, or stored as a unit.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
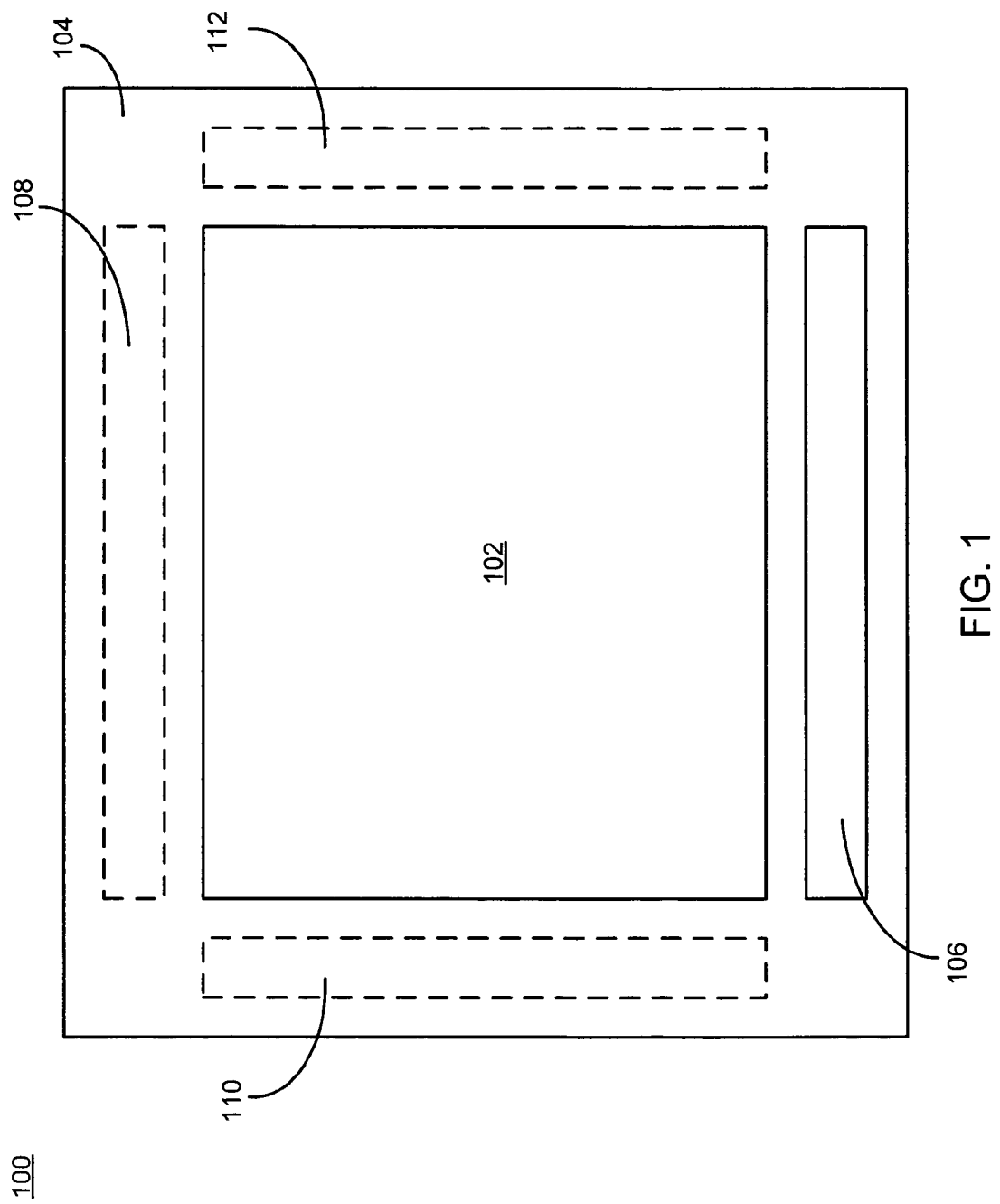
FIG. 1 is a diagram of an example of an implementation of a display device for user personalization with bezel-displayed identification consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The present subject matter provides user personalization with bezel-displayed identification and provides user feedback regarding automated profile selection without obstructing a display area of a display. A display device automatically detects one or more users in proximity to the display device and automatically identifies the persons where configured viewing profiles have been configured for the identified persons. Persons for which viewing profiles have not been configured may also be detected. The display device may identify user(s), for example, by use of biometric identification such as facial recognition, finger/thumb print scan, voice recognition, etc., or other suitable approach for a given implementation. The display device may identify user(s) by input selection or other approaches as suitable for a given implementation.

The identified user's configured viewing profile or an aggregate (e.g., family profile or profile that is generated to represent a blend of the profile of multiple users (e.g., the most conservative content rating of all viewers or the like.)) viewing profile is automatically selected. A profile identifier associated with the selected viewing profile is displayed via an illuminated bezel information display located within a bezel of the display device located outside of a viewing display area of the display. Display settings for the display device associated with the automatically selected viewing profile are automatically adjusted based upon the selected viewing profile.

As such, user personalization is automatically achieved for viewing preferences and device settings are automatically adjusted for the user(s). Additionally, by displaying the profile identifier within the illuminated bezel information display outside of the display area of the display, persons may verify that viewing profile selection is appropriate for a given circumstance. For example, parents may verify that the child's viewing profile is selected to regulate child viewing activities without the parent having to utilize a remote control device or approach the display device, and without the profile identifier obstructing displayed content rendered on the display of the display device.

Further, as an additional example, when adults are viewing content associated with a viewing profile other than a child/family viewing profile that includes controls associated with the parents viewing preferences for the child and the child enters the room, the display device may automatically recognize that the child has entered the room. The display device may make a determination that the selected profile is other than the child/family viewing profile. In such a situation, the display device automatically generates a warning via the illuminated bezel information display that the child has entered the room to alert the parent that the presently displayed content may not be suitable for the child's viewing (e.g., "This show is R-Rated and a child just entered the room") or other content rating alert message. Many other possibilities exist for illuminated bezel information display based upon automated detection of persons proximate to a display device and automated selection of viewing profile and device settings, and all such possibilities are considered within the scope of the present subject matter.

As described above and in more detail below, a display device determines an identity of a person proximate to the display device. The display device determines whether a configured viewing profile exists for the person. Upon determining that the configured viewing profile exists for the person, a profile identifier associated with the configured viewing profile is displayed via a two-dimensional light emitting diode (LED) array located within a bezel of the display device outside of the display area of the display. Display device settings are automatically adjusted based upon the configured viewing profile.

For purposes of the present description, the term "bezel" includes a frame area of a display device enclosure that surrounds the display, or any portion of the display, or any part thereof. A bezel is considered to include an area of the enclosure located outside of the rendering display area of the display enclosed within the display device. The bezel is further considered to include any area of the enclosure that is visible from a perspective of a user viewing rendered content on the display area of the display device.

Visual content, such as a motion picture, television program, or other content, is displayed within a display area of a display device. Such visual content may be from any conventional or unconventional source including, but not limited to broadcast, cable, Telco, Internet, satellite or other sources and may be detected, decoded and/or demultiplexed in any suitable manner to produce a television program viewing-like experience.

Operatively, the viewer's viewing experience may be improved by providing interaction and informational capabilities via a two-dimensional user personalization with bezel-displayed identification with both text and graphics capabilities, including color rendering capabilities, outside of the display area of the display device. By partitioning interaction and information processing to a separate two-dimensional illuminated bezel information display, a viewer may continue to view content without interruption from on-screen display of profile identifier information and/or warnings associated with detection of persons other than persons associated with a selected configured viewing profile (e.g., without use of on-screen menus).

Turning now to FIG. 1, FIG. 1 is a diagram of an example of an implementation of a display device 100 for user personalization with bezel-displayed identification. The display device 100 includes a display 102 located within an enclosure 104. The display 102 may include any display technology capable of rendering content for viewing, such as a liquid crystal display (LCD), light-emitting diode (LED), cathode ray tube (CRT), projection, touchscreen, or other display element or panel. In certain implementations, the display device 100 may be a television display.

The enclosure 104 may be formed or molded from any suitable material for a given implementation, such as plastic, metal, composite, or other material. Further, for purposes of the present description, all areas of the enclosure 104 that are visible from a perspective of a user viewing rendered content on the display 102 are considered a bezel area (e.g., a frame area) of the display device 100. An illuminated bezel information display 106 is shown along a bottom portion of the enclosure 104. The illuminated bezel information display 106, as described in more detail below, is used to display information for a variety of purposes, such as information based upon a configured display mode for the display device 100.

Display of automatically selected profile information and warning/alerts via the illuminated bezel information display 106 allows the user viewing rendered content on the display 102 or a parent, for example, to view information associated with the selected viewing profile without the displayed information obstructing the user's or parent's view of the rendered content. As such, the present subject matter provides for profile information display and user interaction with a device, such as the display device 100, without compromising the user's view of rendered content.

The illuminated bezel information display 106 may include any form of display suitable for a given implementation. For example, the illuminated bezel information display 106 may include an LED array including one or more different colors of LEDs. Further, the illuminated bezel information display 106 may include a two-dimensional sub-pixel LED array including one or more different colors of LEDs, color-controllable LEDs (e.g., red, green, blue (RGB) LEDs), and/or a low-resolution projector. In the case of a low-resolution projector, the enclosure 104 may be formed, for example, via a two shot (2-shot) injection molding process. A 2-shot injection molding process allows mixture of diffusive material with other materials, such as clear, opaque, or translucent materials, to achieve different visual effects for the enclosure 104. In such an implementation, for example, a projection of information onto a contrasting color or blend created by the 2-shot injection may provide contrast for displayed information. Many other variations of illuminated bezel information display are possible and all are considered within the scope of the present subject matter.

For purposes of the present description, a two-dimensional sub-pixel LED array may include a two-dimensional array of LEDs, where each LED has a resolution smaller than a pixel of information to be displayed. As such, granularity for changes within displayed information (e.g., color variations, etc.) via the illuminated bezel information display 106 may be smaller than a pixel of information to be displayed when implemented as a two-dimensional sub-pixel LED array. Interpolation or other techniques may be used to transition colors or edges of images between adjacent pixels to create a finer resolution than what is encoded within raw information to be displayed. Additionally, more information may be displayed using the improved resolution of a two-dimensional sub-pixel LED array. Accordingly, implementation of the illuminated bezel information display 106 as a two-dimensional sub-pixel LED array provides possibilities for improving resolution for the information during rendering of the information and for allowing more information to be displayed via the illuminated bezel information display 106. Alternatively, the illuminated bezel information display 106 may include a liquid crystal display (LCD), cathode ray tube (CRT), projection, touchscreen, or other display element or panel without departure from the scope of the present subject matter.

An illuminated bezel information display 108, an illuminated bezel information display 110, and an illuminated bezel information display 112 are also illustrated. Each of the illuminated bezel information displays 108, 110, and 112 is depicted within FIG. 1 as a dashed-line representation to illustrate that these respective devices may be alternative locations for the illuminated bezel information display 106 or that they may be additional or separate illuminated bezel information displays of the display device 100, as appropriate for a given implementation. Further, additional illuminated bezel information displays beyond those illustrated within the present example may be included within a device, such as the display device 100. As another alternative, the example illuminated bezel information displays 106, 108, 110, and 112 may also be interconnected at the respective corners of the enclosure 104 to allow information to be displayed around an entire circumference of the display 102. As such, an illuminated bezel information display may be located within any portion of a frame area or bezel, such as the enclosure 104 of the display device 100, outside of the display area of a display, such as the display 102. Further, any or all of the illuminated bezel information displays 106, 108, 110, and 112 may span an entire distance from the display 102 to an outer edge of the enclosure 104 or any portion thereof. As such, up to the entire visible area of the enclosure 104 may be formed using an illuminated bezel information display. Accordingly, many variations are possible for placement of illuminated bezel information displays and all are considered within the scope of the present subject matter.

The display device 100 may be any device capable of rendering and processing information as described above and in more detail below. For example, the display device 100 may include devices such as a television, a personal computer (e.g., desktop, laptop, palm, etc.), a handheld device (e.g., cellular telephone, personal digital assistant (PDA), email device, music recording or playback device, etc.), or any other device capable of rendering and processing information as described above and in more detail below. Scrolling and other techniques can be used to render information on the bezel information display(s) when the information exceeds the capacity of the respective illuminated bezel information display.

Figure 2:
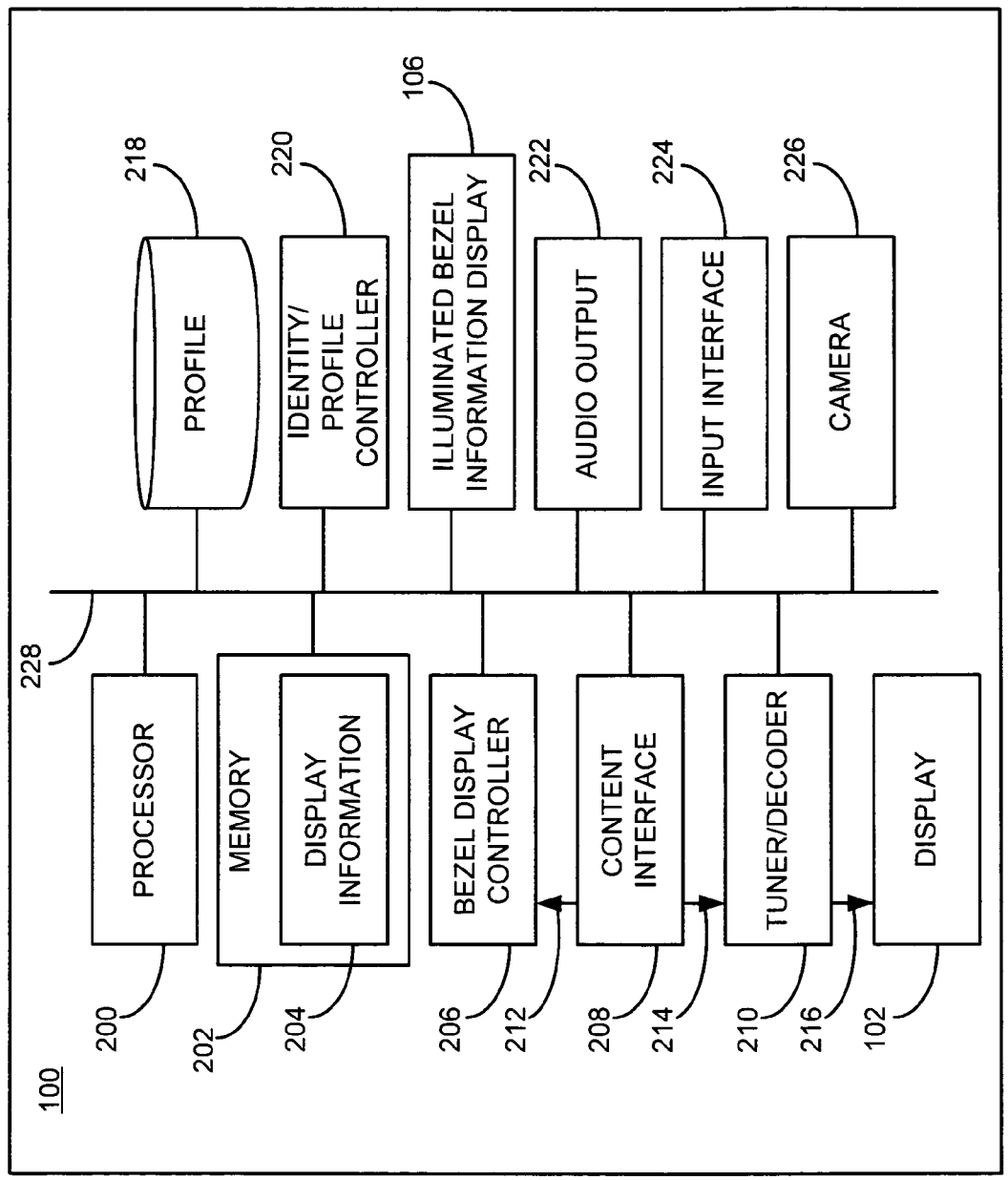
FIG. 2 is a block diagram of an example of an implementation of the display device for user personalization with bezel-displayed identification consistent with certain embodiments of the present invention.

FIG. 2 is a block diagram of an example of an implementation of the display device 100 for user personalization with bezel-displayed identification. A processor 200 provides computer instruction execution, computation, and other capabilities within the display device 100. The display 102 and the illuminated bezel information display 106 are illustrated.

A memory 202 includes a display information storage area 204 that stores information, such as identity information associated with persons determined to be proximate to the display device 100 and other information, associated with user personalization of information displayed via the illuminated bezel information display 106. It is understood that the memory 202 may include any combination of volatile and non-volatile memory suitable for the intended purpose, distributed or localized as appropriate for a given implementation, and may include other memory segments not illustrated within the present example for ease of illustration purposes. For example, the memory 202 may include a code storage area, a code execution area, and a data area without departure from the scope of the present subject matter.

A bezel display controller 206 controls display of content on the illuminated bezel information display 106. As described in more detail below, the bezel display controller 206 may cause a variety of information to be displayed via the illuminated bezel information display 106. For example, the bezel display controller 206 may display a profile identifier associated with a configured viewing profile that is automatically selected based upon identification of persons proximate to the display device 100, as described in more detail below.

A content interface module 208 provides communication capabilities for the display device 100. The content interface module 208 may include any form of interconnection suitable for the intended purpose, including a private or public network such as an intranet or the Internet, respectively, direct inter-module interconnection, dial-up, wireless, or any other interconnection mechanism capable of interconnecting the display device 100 to other components for access to content and information for rendering via the display 102 and the illuminated bezel information display 106, respectively, as describe above and in more detail below. It is also understood that the content interface module 208 may include telephone interconnection capabilities via either wireless or wired carrier, and any other interconnection capabilities for accessing content. The content interface module 208 may also include capabilities for text message sending and receiving, RSS feed receipt and processing, and stock ticker information receipt and processing, among other information processing capabilities. The capabilities described above for the content interface module 208 are understood to be within the scope of the present subject matter, but are not described in detail herein for brevity. It is understood that a person of skill in the art will be able to implement such an interface appropriate for a given implementation based upon the description herein.

A tuner/decoder module 210 receives television (e.g., audio/video) content and decodes that content for display via the display 102. The content may include content formatted either via any of the motion picture expert group (MPEG) standards, or content formatted in any other suitable format for reception by the tuner/decoder module 210. It is understood that the tuner/decoder module 210 may include any hardware, programmed processor(s), and memory used to carry out the functions of the tuner/decoder module 210. For example, the tuner/decoder module 210 may include additional controller circuitry in the form of application specific integrated circuits (ASICs), antennas, processors, and/or discrete integrated circuits and components for performing electrical control activities associated with the tuner/decoder module 210 for tuning to and decoding content received either via wireless or wired connections to the display device 100.

Three directional connections are illustrated in association with the bezel display controller 206, the content interface module 208, the tuner/decoder module 210, and the display 102. A directional connection 212 allows the content interface module 208 to provide received content and information directly to the bezel display controller 206 for rendering via the illuminated bezel information display 106. A directional connection 214 allows the content interface module 208 to provide received content, such as MPEG encoded content received via IP-based communications to the tuner/decoder module 210 for decoding and rendering via the display 102. A directional connection 216 allows the tuner/decoder module 210 to provide decoded content directly to the display 102 for rendering. As such, content received by the content interface module 208 may be routed to either of the bezel display controller 206 or the tuner/decoder module 210 as appropriate for the given information/content, via the directional connection 212 and the direction connectional 214, respectively, without additional intervention or control by the processor 200. Additionally, content for display via the display 102 may be routed from the tuner/decoder module 210 to the display 102 via the directional connection 216 without additional intervention or control by the processor 200.

It is noted that, though the present example interconnections are described, other interconnections are possible and are considered within the scope of the present subject matter. For example, additional interconnections may be provided to allow the tuner/decoder module 210 to provide closed caption or other information to the bezel display controller 206 for rendering via the illuminated bezel information display 106. Alternatively, closed captioning or other information may be provided via other connectivity between the modules described below and as illustrated within the present example.

A profile database 218 provides storage capabilities for configured viewing profiles and related information. For example, configured viewing profiles and profile identifier information may be stored within the profile database 218 and displayed via the illuminated bezel information display 106. Identification matching information may also be stored within the profile database 218 as suitable for a given implementation to allow matching of persons detected proximate to the display device 100. For example, the profile database 218 may store previously-captured biometric identification information (e.g., identifying characteristics) for use in matching input information for recognition purposes, such as facial images for use during facial recognition, scanned images for finger/thumb print recognition, voice frequency and image characteristics for voice recognition, and other related information for use during automated profile selection. The profile database 218 may also include warning and alert information for display via the illuminated bezel information display 106, as described above and in more detail below. The profile database 218 may also include patterns, such as random patterns for synchronizing display of random continually changing color patterns with music or for other purposes.

An identity/profile controller 220 provides identification capabilities for the display device 100. The identity/profile controller 220 may, for example, identify a person proximate to a display device and determine whether a configured viewing profile exists for the person. The identity/profile controller 220 may identify persons proximate to the display device, for example, by use of biometric identification such as facial recognition, finger/thumb print scan, voice recognition, etc., or other suitable approach for a given implementation. The identity/profile controller 220 may also receive information associated with creation and/or modification of viewing profiles and may identify user(s) by input selection (as described in more detail below) or by other approaches as suitable for a given implementation. Further, the identity/profile controller 220 may interface with and instruct the bezel display controller 206 to display profile identification information associated with configured viewing profiles and alert/warning information via the illuminated bezel information display 106, as described above and in more detail below. The identity/profile controller 220 further automatically adjusts display device settings for the display device 100 based upon configured viewing profiles, as described in more detail below. The display device settings that are automatically adjusted include settings such as volume, color contrast, tint, and other settings.

An audio output 222 provides audio output control for the display device 100. The audio output 222 may include appropriate drive circuitry for speakers and other circuitry. However, it is noted that the audio output 222 may include speakers in a given implementation without departure from the scope of the present subject matter. In such an implementation, alerts and/or warnings associated with detection of persons other than persons associated with a configured viewing profile may be audibly announced to persons proximate to the display device 100. Further, the display of visual information via the illuminated bezel information display 106 may be synchronized with music.

An input interface 224 provides input capabilities for the user. For purposes of the present description, the input interface 224 may include one or more input devices or may be configured to receive inputs from one or more input devices, such as those described below or other input devices. The input interface 224 may include infra red (IR) circuitry for receiving input signals from a remote control device (not shown). The input interface 224 may also include wireless input interface circuitry. For example, radio frequency (RF) remote control signals or other signals, such as Bluetooth and other circuitry, for receiving user input information as appropriate for a given implementation may also be included. The input interface 224 may also include input circuitry for detecting inputs via a mouse, pen, trackball, keyboard, or other input device. The input interface 224 may include input circuitry sufficient to allow one or more input devices to be used.

The input interface 224 may also include processing capabilities for information associated with configuration of viewing profiles and may pass this information to the identity/profile controller 220 for retrieving, creation, and modification of configured viewing profiles. The input interface 224 may further include processing capabilities for receipt of information associated with a user identity, such as a password or account number, and may pass the received information to the identity/profile controller 220 for identification of user(s) in association with the input of identifying information associated with the user. The information associated with a user identity may be received, for example, from a remote control device or input device associated with the display device 100 (not shown). Additionally, the input interface 224 may include processing capabilities for receipt of audio input for voice recognition purposes and may pass the received raw audio information, either in analog or digital form, to the identity/profile controller 220 for identification of user(s). The audio input for voice recognition may be received, for example, via a microphone input associated with a remote control device or associated with the display device 100 (not shown). The input interface 224 may include processing capabilities for receipt of image input, as described in more detail below, for image recognition for identification of users in proximity to the display device 100. The image input for image recognition may be received, for example, via an image capturing device, such as an image or retinal scanner, associated with a remote control device or associated with the display device 100 (not shown). The input interface 224 may also include processing capabilities for receipt of motion sensor or other input technology to allow detection of motion of persons proximate to the display device 100. Many other possible input configurations for the input interface 224 are possible and all are considered within the scope of the present subject matter.

A camera 226 provides image capture capabilities for the display device 100. Images captured by the camera 226 may be processed, for example, by the input interface 224 or passed directly to the identity/profile controller 220 for facial recognition.

It should be noted that the modules described above in association with the display device 100 are illustrated as component-level modules for ease of illustration and description purposes. It is also understood that these modules include any hardware, programmed processor(s), and memory used to carry out the respective functions of these modules as described above and in more detail below. For example, the respective modules may include additional controller circuitry in the form of application specific integrated circuits (ASICs), processors, and/or discrete integrated circuits and components for performing electrical control activities. Additionally, the modules may include interrupt-level, stack-level, and application-level modules as appropriate. Furthermore, the modules may include any memory components used for storage, execution, and data processing by these modules for performing the respective processing activities. The modules may also form a portion of other circuitry described below without departure from the scope of the present subject matter.

It should also be noted that certain modules such as the bezel display controller 206 and the identity/profile controller 220 may alternatively be implemented as applications stored within the memory 202. In such an implementation, the respective modules may include instructions executed by the processor 200 for performing the functionality described herein. The processor 200 may execute these instructions to provide the processing capabilities described above and in more detail below for the display device 100. These modules may form a portion of an interrupt service routine (ISR), a portion of an operating system, a portion of a browser application, or a portion of a separate application without departure from the scope of the present subject matter.

The processor 200, the memory 202, the bezel display controller 206, the content interface module 208, the tuner/decoder module 210, the profile database 218, the identity/profile controller 220, the audio output 222, the input interface 224, the camera 226, and the illuminated bezel information display 106 are interconnected within the display device 100 via an interconnection 228. The interconnection 228 may include any form of interconnection suitable for a given implementation. For example, the interconnection 228 may include a system bus, a network, or any other interconnection capable of providing the respective components with suitable interconnection for the respective purposes. Other interconnections are possible and all are considered within the scope of the present subject matter.

While the display device 100 is illustrated with and has certain components described, other modules and components may be associated with the display device 100. Additionally, it should be noted that, while the display device 100 is described as a single device for ease of illustration purposes, the components within the display device 100 may alternatively be distributed and interconnected via a network, such as a home network. Many arrangements are possible for components of the display device 100 and all are considered within the scope of the present subject matter. It should also be understood that, though the profile database 218 is shown as a separate component, the information stored within the profile database 218 may be stored within the memory 202 without departure from the scope of the present subject matter. Accordingly, the display device 100 may take many forms.

In the case of a television (TV) display, the respective illuminated bezel information display may be used to display a user's identity, such as via a user identifier, or profile identifier in certain implementations. In certain examples, the display may associate the user with a content rating system and display the maximum rating associated with that user or display a rating of the current rendered program material (e.g., a motion picture rating of PG, etc.). In yet another alternative implementation, advertisements based upon a user's profile preferences for advertising may be selected and displayed. Many other variations of information display associated with user preferences to personalize displayed information may be used and all are considered within the scope of the present subject matter.

FIG. 3 through FIG. 5B described below provide example processes that may be executed by devices, such as the display device 100, to perform the user personalization with bezel-displayed identification described herein. Many other variations on the example processes are possible and all are considered within the scope of the present subject matter. The example processes may be performed by modules, such as the bezel display controller 206, the identity/profile controller 220, and/or executed by the processor 200. It should be noted that time out procedures and other error control procedures are not illustrated within the example processes described below for ease of illustration purposes. However, it is understood that all such procedures are considered to be within the scope of the present subject matter. Further, certain portions of the processes described below indicate that certain input requests are detected via an input device generally for ease of illustration purposes. However, it is understood that any such detection of an input request may be detected via an input interface component, such as the input interface 224. Further, within FIGS. 4 through 5B, the illuminated bezel information display 106 is referred to as an "LED array" due to space limitations within the drawing space. However, it is understood that the illuminated bezel information display 106 may include any form or technology of display within the scope of the present subject matter.

Figure 3:
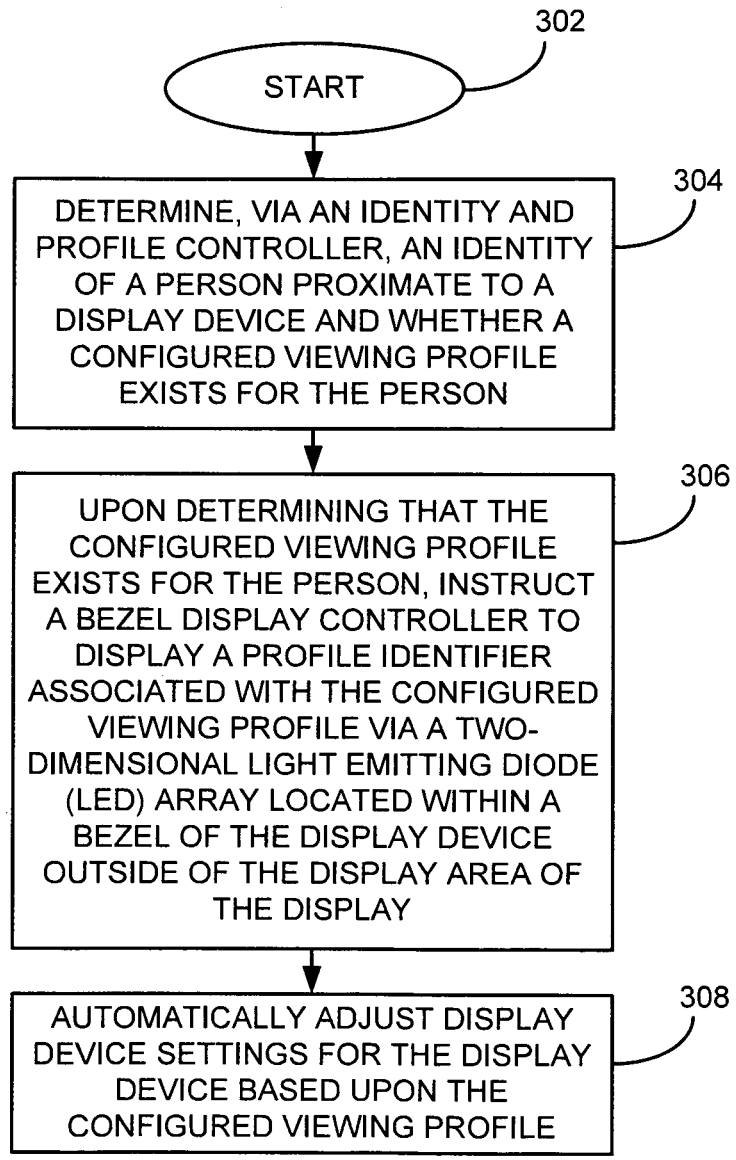
FIG. 3 is a flow chart of an example of an implementation of a process for automated control of user personalization with bezel-displayed identification consistent with certain embodiments of the present invention.

FIG. 3 is a flow chart of an example of an implementation of a process 300 for automated control of user personalization with bezel-displayed identification. The process 300 begins at 302. At block 304, the process 300 determines, via an identity profile controller, an identity of a person proximate to a display device, and whether a configured viewing profile exists for the person. At block 306, upon determining that the configured viewing profile exists for the person, the process 300 instructs a bezel display controller to display a profile identifier associated with the configured viewing profile via a two-dimensional light emitting diode (LED) array located within a bezel of the display device outside of the display area of the display. At block 308, the process 300 automatically adjusts display device settings for the display device based upon the configured viewing profile. While this example depicts an LED array, other video arrays can also be used without limitation.

Figure 4:
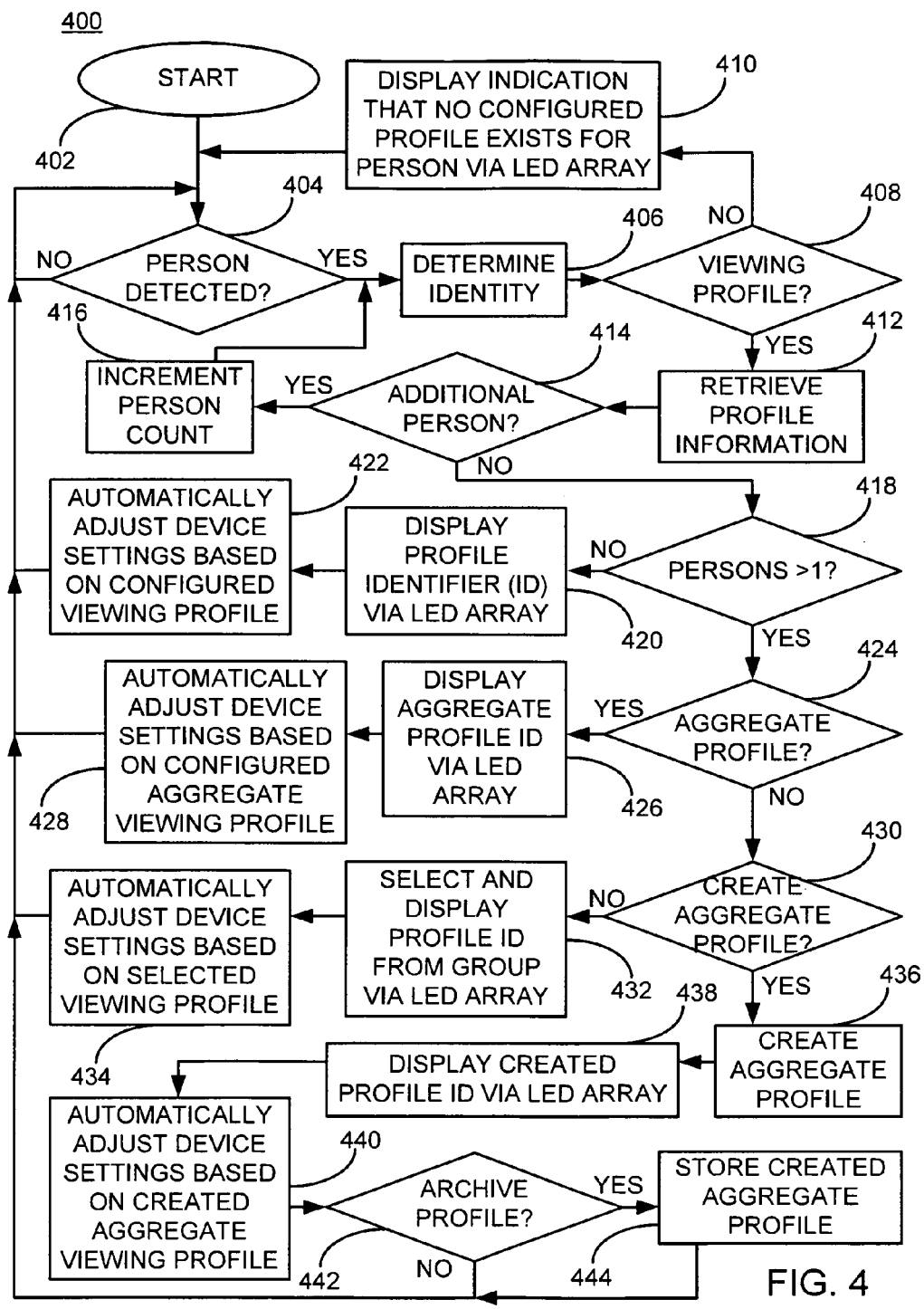
FIG. 4 is a flow chart of an example of an implementation of a process for automated control of user personalization with bezel-displayed identification for profile selection consistent with certain embodiments of the present invention.

FIG. 4 is a flow chart of an example of an implementation of a process 400 for automated control of user personalization with bezel-displayed identification for profile selection according to the present subject matter. The process 400 is illustrated and described in association with detection of a person entering a room where the display device 100 is located. However, it is understood that similar processing may be performed to detect a person leaving a room where the display device 100 is located.

The process 400 begins at 402. At decision point 404, the process 400 determines whether a person proximate to a display device, such as the display device 100, has been detected. As described above, a person may be detected in a variety of ways. For example, the process 400 may detect that one or more persons is proximate to the display device 100 via a motion sensor (not illustrated) in association with the input interface 224. Additionally, the camera 226 may be utilized to detect movement and persons proximate to the display device 100. Many other possibilities for detection of persons proximate to the display device 100 are possible and all are considered within the scope of the present subject matter.

When a determination is made that a person has been detected at decision point 404, the process 400 determines an identity of the person at block 406. The identity of the person may be performed, for example, by facial recognition, voice recognition, thumb/finger print recognition, or another form of recognition may be performed. Identity recognition may further be performed utilizing input from the input interface 224 or the camera 226 in conjunction with identification matching information stored within the profile database 218, as described above.

As such, the process 400 may perform a biometric analysis of at least one feature of the person. The biometric analysis may include determining an identifying characteristic of the person, comparing the identifying characteristic of the person to identifying characteristics stored in the profile database 218, and determining whether the identifying characteristic of the person exists within the profile database 218.

Determining the identifying characteristic of the person may include receiving a fingerprint scan associated with the person, receiving a facial image scan associated with the person, receiving a pass code associated with the person, receiving a spectral image from a voice recognition module representative of captured speech of the person, or other actions. Determining the identifying characteristic of the person may also include receiving biometric information, such as a thumb/finger print, from a remote control device (not shown) associated with the display device 100. Receiving the biometric information from the remote control device may include, for example, receiving at least one of an image scan of a face of the person where the remote control device includes a camera, receiving a voice scan of a voice of the person where the remote control device includes a microphone, receiving a thumb or fingerprint scan of the person where the remote control device includes a thumb/finger print scanner.

Comparing the identifying characteristic of the person to a database of identifying characteristics may include searching the profile database 218 of identifying characteristics using the identifying characteristic of the person. In such a situation, determining whether the identifying characteristic of the person exists within the database of identifying characteristics may include determining whether a match exists within the profile database 218 for the identifying characteristic of the person.

Upon determining that the identifying characteristic of the person exists within the profile database 218, the process 400 retrieves the identity of the person proximate to the display device from a database record associated with the identifying characteristic of the person within the profile database 218. In the event no match is made, in accord with certain implementations, the system may invoke a default viewing profile having default parameters for use in control of the behavior of the display device (e.g., a television device display). Such a default may be user defined or predefined at the time of manufacture.

At decision point 408, the process 400 makes a determination as to whether a configured viewing profile exists, for example within the profile database 218, for the identified person. It should be understood that multiple persons may be detected and identified. In such a situation, an aggregate profile, such as a family profile may be configured and exist within the profile database 218.

When a determination is made at decision point 408 that a configured viewing profile does not exist for the identified person(s), the process 400 instructs a bezel display controller, such as the bezel display controller 206, to display an indication that no configured viewing profile exists for the identified person(s) via the illuminated bezel information display 106 at block 410 and returns to decision point 404 to await detection of another person proximate to the display device 100.

When a determination is made that a configured viewing profile exists, the process 400 retrieves the profile information associated with the identified person at block 412. At decision point 414, the process 400 makes a determination as to whether an additional person has been detected. When a determination is made that an additional person has been detected, the process 400 increments the person count at block 416 and returns to block 406 and iterates as described above.

When a determination is made at decision point 414 that no more additional persons have been detected, the process 400 makes a determination as to whether the person count is greater than one (e.g., "1") at decision point 418. When a determination is made that the person count is not greater than one, the process 400 instructs the bezel display controller 206 to display a profile identifier via the illuminated bezel information display 106 at block 420. The profile identifier may include an identification, such as a name or the identified person or a profile name associated with the configured viewing profile. At block 422, the process 400 automatically adjusts display device settings for the display device 100 based upon the configured viewing profile. For example, the configured viewing profile may include pre-configured setting preferences for volume, color contrast, tint, maximum content rating, and other settings that the identified user (or default) associated with the configured viewing profile prefers. These pre-configured settings may be automatically adjusted based upon identification of the person and the preferences stored within the configured viewing profile. The process 400 returns to decision point 404 to await detection of another person and iterates as described above.

When a determination is made at decision point 418 that the person count is greater than one, the process 400 makes a determination as to whether a configured aggregate viewing profile exists or may be created for the multiple persons that have been identified at decision point 424. As such, the process 400 determines whether multiple persons are proximate to the display device 100, determines whether a configured viewing profile exists for each of the multiple persons proximate to the display device 100, and upon determining that the configured viewing profile exists for at least two of the multiple persons, the process 400 determines whether a configured aggregate viewing profile exists for the at least two of the multiple persons. In the alternative, a profile can be created by the system by taking the most conservative parameters of each individual profile.

When a determination is made at decision point 424 that a configured aggregate viewing profile exists, the process 400 instructs the bezel display controller 206 to display a profile identifier associated with the configured aggregate viewing profile via the illuminated bezel information display 106 at block 426. At block 428, the process 400 automatically adjusts display device settings for the display device 100 based upon the configured aggregate viewing profile and returns to decision point 404 to await detection of another person proximate to the display device 100.

When a determination is made at decision point 424 that a configured aggregate viewing profile does not exist, the process 400 makes a determination at decision point 430 as to whether an aggregate profile should be created based upon the identified persons with configured viewing profiles. This determination may be made, for example, by instructing the bezel display controller 206 to display an inquiry via the illuminated bezel information display 106 requesting that the one of the identified users provide input to indicate whether to create an aggregate viewing profile.

When a determination is made at decision point 430 that a user selection has been detected requesting not to create an aggregate viewing profile or upon detection of a timeout, the process 400 selects one of the configured viewing profiles and instructs the bezel display controller 206 to display the selected profile identifier via the illuminated bezel information display 106 at block 432. The selection of the configured viewing profile may be made based upon pre-configured selection criteria. For example, parental controls may be implemented to allow a parent to configure the selection process to automatically select the most-restrictive profile when configured viewing profiles of different restriction levels exist for the identified persons. In this manner, a child entering a room may automatically trigger a change in the settings for the display device 100 to, for example, change from a program rated for a viewer older than the entering child. The process 400 automatically adjusts display device settings for the display device 100 based upon the selected configured viewing profile at block 434 and returns to decision point 404 to await detection of another person proximate to the display device 100.

When a determination is made at decision point 430 that a user selection has been detected requesting to create an aggregate viewing profile, the process 400 creates an aggregate viewing profile settings based upon the existing configured viewing profile for at least two of the multiple persons at block 436. For example, the process 400 may create an aggregate family viewing profile. At block 438, the process 400 instructs the bezel display controller 206 to display an identification, such as a created viewing profile identifier, to indicate that the aggregate viewing profile has been created via the illuminated bezel information display 106. At block 440, the process 400 automatically adjusts display device settings for the display device 100 based upon the created aggregate viewing profile.

At decision point 442, the process 400 makes a determination as to whether to archive the created aggregate viewing profile. For example, the process 400 may detect a request via an input device to archive the created aggregate viewing profile as a family viewing profile. When a determination is made to archive the created aggregate viewing profile, the process 400 stores the created aggregate viewing profile as the family viewing profile within a configured profile database, such as the profile database 218, at block 444. Upon completion of storing the created aggregate viewing profile at block 444 or upon determining at decision point 442 not to archive the created aggregate viewing profile, the process 400 returns to decision point 404 to await detection of another person proximate to the display device 100.

As such, the process 400 detects multiple persons entering an area proximate to the display device 100. The process 400 identifies the persons proximate to a display device 100 and selects or creates an aggregate viewing profile. Display device settings for the display device 100 are automatically adjusted based upon a selected configured viewing profile. Selected viewing profiles may be automatically changed based upon detection of persons with different configured viewing profiles, such as children.

Figure 5A:
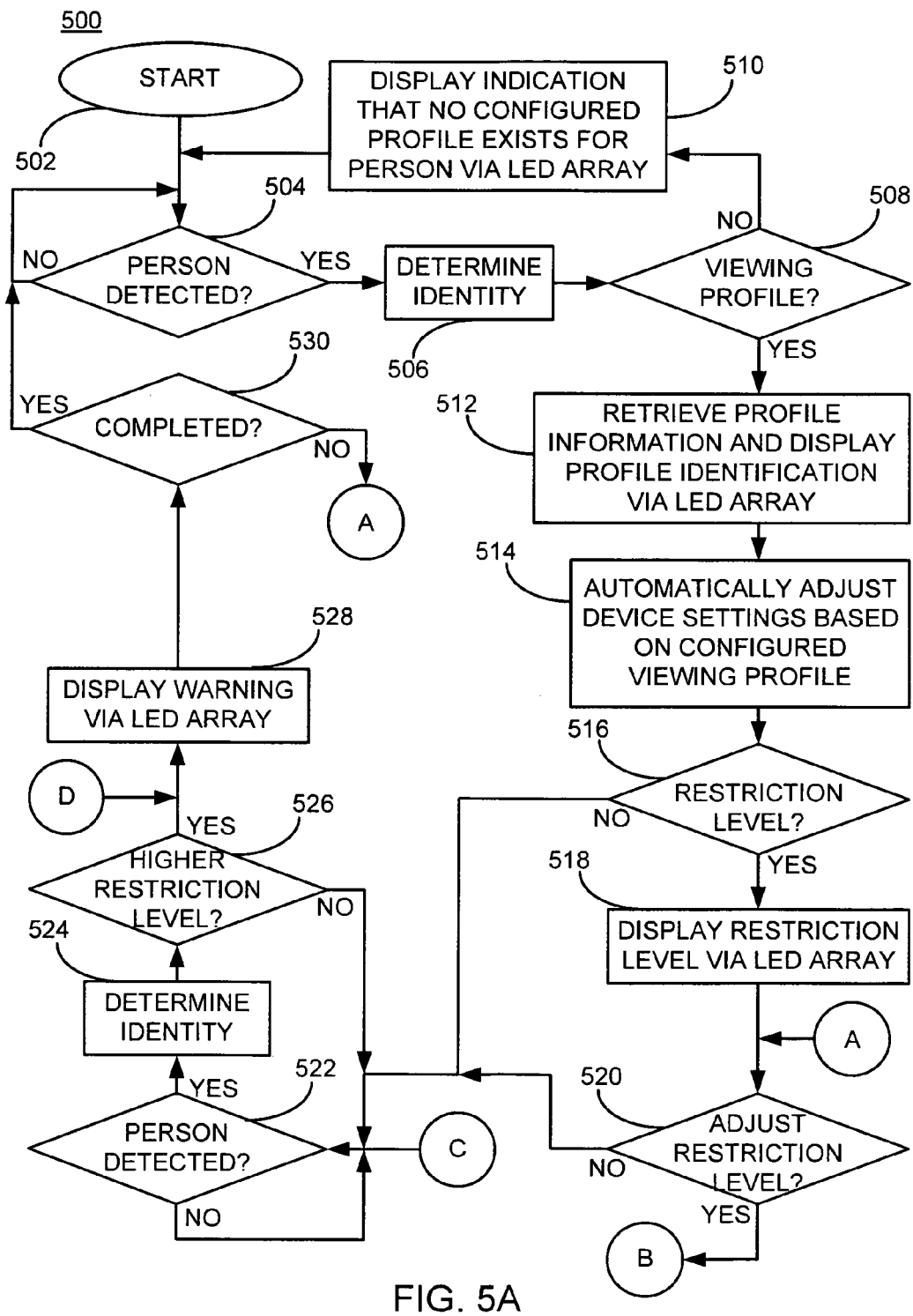
FIG. 5A is a flow chart of initial processing of an example of an implementation of a process for automated control of user personalization with bezel-displayed identification for restriction level changes consistent with certain embodiments of the present invention.
Figure 5B:
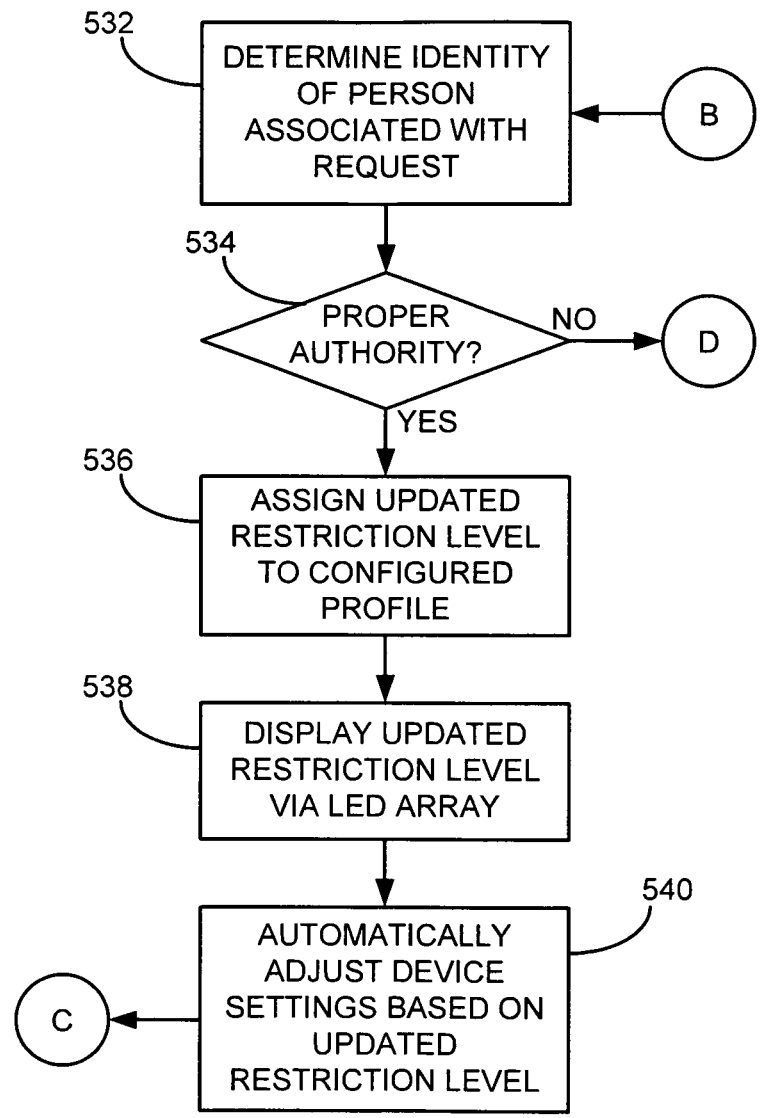
FIG. 5B is a flow chart of a second portion of an example of an implementation of a process for automated control of user personalization with bezel-displayed identification for restriction level changes consistent with certain embodiments of the present invention.

FIGS. 5A-5B illustrate a flow chart of an example of an implementation of a process 500 for automated user personalization with bezel-displayed identification for restriction level changes according to the present subject matter. The process 500 builds upon the subject matter of FIG. 4 described above. As such, certain details regarding processing that are described above are omitted below for brevity and may be reviewed in detail above in association with the description of FIG. 4. FIG. 5A illustrates initial processing within the process 500. The process 500 begins at 502. At decision point 504, the process 500 determines whether a person proximate to a display device, such as the display device 100, has been detected. When a determination is made that a person has been detected at decision point 504, the process 500 determines an identity of the person at block 506. At decision point 508, the process 500 makes a determination as to whether a configured viewing profile exists, for example within the profile database 218, for the identified person. It should be understood that multiple persons may be detected and identified. In such a situation, an aggregate profile, such as a family profile may be configured and exist within the profile database 218.

When a determination is made at decision point 508 that a configured viewing profile does not exist for the identified person(s), the process 500 instructs the bezel display controller 206 to display an indication that no configured viewing profile exists for the identified person(s) via the illuminated bezel information display 106 at block 510 and returns to decision point 504 to await detection of another person proximate to the display device 100.

When a determination is made at decision point 508 that a configured viewing profile exists, the process 500 retrieves the profile information associated with the identified person and instructs the bezel display controller 206 to display a profile identifier via the illuminated bezel information display 106 at block 512. At block 514, the process 500 automatically adjusts display device settings for the display device 100 based upon the configured viewing profile.

At decision point 516, the process 500 makes a determination as to whether a restriction level is associated with the configured viewing profile for the person. When a determination is made that a restriction level is associated with the configured viewing profile for the person, the process 500 instructs the bezel display controller 206 to display a restriction identifier via the illuminated bezel information display 106 indicating the restriction level associated with the configured viewing profile at block 518. Displaying the restriction identifier via the illuminated bezel information display 106 may include displaying that a content blocking feature of the display device 100 is active where a content blocking feature, such as a parental control, is associated with the configured viewing profile.

At decision point 520, the process 500 makes a determination as to whether a request to adjust the restriction level to an updated restriction level, such as via the input interface 224 as entered by a parent or adult family member, as been detected. It is understood that the request to adjust the restriction level to an updated restriction level may also be a request to increase or decrease the selected restriction level. For example, a request to increase the restriction level may be generated by a parent when a child enters a room, while the request to decrease the restriction level may be generated by a parent when a child exits a room. Processing associated with an affirmative decision at decision point 520 will be described in more detail below after processing associated with a non-affirmative decision.

When a determination is made that a request to adjust the restriction level has not been detected or upon determining at decision point 516 that a restriction level is not associated with the configured viewing profile, the process 500 makes a determination as to whether another person has been detected in proximity to the display device 100 at decision point 522. The process 500 may iterate at decision point 522 until another person is detected or until other processing, such as a power-off condition (not shown for ease of illustration purposes), causes the process 500 to stop processing to detect another person proximity to the display device 100.

When a determination is made that another person has been detected in proximity to the display device 100, the process 500 determines an identity of the other person at block 524. It is understood that the processing at block 524 may include processing similar to that described above in association with block 506 to identify the person and with block 512 to retrieve and to instruct the bezel display controller 206 to display viewing profile information associated with the additional person. This additional processing is not shown for ease of illustration purposes.

At decision point 526, the process 500 makes a determination as to whether the additional person has a restriction level higher than the selected restriction level associated with the first configured viewing profile retrieved and processed. For example, when a child enters a room where adults are watching an R-rated film, the process 500 may determine that the child has an associated restriction level higher (e.g., more limiting) than a restriction level associated with the adults.

When a determination is made at decision point 526 that the additional person does not have a restriction level higher than the selected restriction level (e.g., another adult has entered), the process 500 returns to decision point 522 and iterates as described above. When a determination is made at decision point 526 that the additional person has a restriction level higher than the selected restriction level (e.g., a child has entered), the process 500 instructs the bezel display controller 206 to display a warning via the illuminated bezel information display 106 at block 528. The warning display may, for example, include displaying text indicating a viewing rating of displayed content and a notice that the person other than the person proximate to the display device has entered. The displayed warning may include a notice such as "This is R-Rated and a child just walked in."

As such, the process 500 detects entry of a person other than the person proximate to the display device 100, determines that the person other than the person proximate to the display device has a restriction level higher than a restriction level of the person proximate to the display device 100, and instructs the bezel display controller 206 to display a warning via the illuminated bezel information display 106. Many other possibilities exist for display of warning information via the illuminated bezel information display 106 without obstructing the viewing content of the display device 100 and all are considered within the scope of the present subject matter.

At decision point 530, the process 500 makes a determination as to whether processing has been completed, such as via a power-off condition or other change to the operating mode for display of information and personalization for settings for the display device 100 via the illuminated bezel information display 106. When a determination is made at decision point 530 that processing has been completed, the process 500 returns to decision point 504 to determine whether a person is detected and iterates as described above.

When a determination is made at decision point 530 that processing has not been completed, the process 500 returns to decision point 520 to determine whether a request to adjust the restriction level to an updated restriction level has been detected. When a determination is made that a request to adjust the restriction level to an updated restriction level has been detected, the process 500 transitions to block 532 to continue processing as shown and described in association with FIG. 5B.

FIG. 5B illustrates a second portion of an example of an implementation of the process 500 for automated control of user personalization with bezel-displayed identification for restriction level changes. At block 532, the process 500 determines an identity of a person associated with the detected request to adjust the restriction level to the updated restriction level. At decision point 534, the process 500 makes a determination as to whether the person associated with the detected request to adjust the restriction level has authority to adjust the restriction level to the updated restriction level. When a determination is made that the person associated with the detected request to adjust the restriction level does not have authority to adjust the restriction level to the updated restriction level, the process 500 returns to continue iteratively processing, as described in association with FIG. 5A above beginning at block 528 and instructs the bezel display controller 206 to display a warning indicating that the person requesting the change to the restriction level does not have proper authority to request the change. In this manner, the process 500 may prohibit children from requesting more-lenient restriction levels than those established and configured by parents.

When a determination is made at decision point 534 that the person associated with the detected request to adjust the restriction level has authority to adjust the restriction level to the updated restriction level, the process 500 assigns the updated restriction level to the configured viewing profile at block 536. At block 538, the process 500 instructs the bezel display controller 206 to display the updated restriction level via the illuminated bezel information display 106. At block 540, the process 500 automatically adjusts display device settings for the display device 100 based upon the assigned updated restriction level of the configured viewing profile. The process 500 returns to continue iteratively processing as described in association with FIG. 5A above beginning at decision point 522 to determine whether another person has been detected. As described above, when a determination is ultimately made at decision point 530 that processing is completed, the process 500 returns to decision point 504 to determine whether a person is detected and iterates as described above.

As such, the process 500 detects persons proximate to a display device, retrieves configured viewing profiles and adjusts settings for the display device based upon the configured viewing profiles, and instructs a bezel display controller to display profile information and warnings via an illuminated bezel information display. The process 500 implements restriction levels associated with configured viewing profiles and processes requests to adjust a configured restriction level. In response to a request to adjust a configured restriction level, the process 500 authenticates the requesting person based upon configured profile authentication information and permits the change if the person is authorized or instructs a bezel display controller to display a warning via the illuminated bezel information display if the person is not authorized to request the change.

Based upon the foregoing description, the present subject matter provides user personalization with bezel-displayed identification. The present subject matter provides improved parental controls by automated detection and processing of information associated with configured viewing profiles. Further, user personalization with bezel-displayed identification is provided along with user feedback regarding automated profile selection without obstructing a display area of a display.

Operatively, the viewer's viewing experience may be improved by providing interaction and informational capabilities via a two-dimensional illuminated bezel information display with both text and graphics capabilities, including color rendering capabilities, outside of the display area of the display device. By partitioning interaction and information processing to a separate two-dimensional illuminated bezel information display, a viewer may continue to view content without interruption from on-screen display of interaction and information, such as on-screen menus.

Thus, in accord with certain implementations, a method of providing user-feedback regarding automated profile selection without obstructing a display area of a display involves determining, via an identity profile controller: an identity of a person proximate to a display device; and whether a configured viewing profile exists for the person; and upon determining that the configured viewing profile exists for the person: instructing a bezel display controller to display a profile identifier associated with the configured viewing profile via a two-dimensional light emitting diode (LED) array located within a bezel of the display device outside of the display area of the display; and automatically adjusting display device settings for the display device based upon the configured viewing profile.

In certain implementations, the method of providing user-feedback regarding automated profile selection without obstructing a display area of a display further involves determining that multiple persons are proximate to the display device; determining whether a configured viewing profile exists for each of the multiple persons proximate to the display device; and upon determining that the configured viewing profile exists for at least two of the multiple persons, determining whether a configured aggregate viewing profile exists for the at least two of the multiple persons. In certain implementations, upon determining that the configured aggregate viewing profile exists for the at least two of the multiple persons, the method further involves instructing the bezel display controller to display a profile identifier associated with the configured aggregate viewing profile via the two-dimensional LED array; and automatically adjusting device settings for the display device based upon the configured aggregate viewing profile. In certain implementations, upon determining that no configured aggregate viewing profile exists for the at least two of the multiple persons, the method further involves creating aggregate viewing profile settings based upon the existing configured viewing profile for at least two of the multiple persons; instructing the bezel display controller to display an identification that the aggregate viewing profile has been created via the two-dimensional LED array; and automatically adjusting the display device settings for the display device based upon the created aggregate viewing profile. In certain implementations, the method further involves detecting a request via an input device to archive the created aggregate viewing profile as a family viewing profile; and storing the created aggregate viewing profile as the family viewing profile within a profile database. In certain implementations, upon determining that no configured viewing profile exists for at least at least one of the multiple persons, the method further involves instructing the bezel display controller to display an indication that no configured viewing profile exists for the at least one of the multiple persons via the two-dimensional LED array. In certain implementations, upon determining that no configured viewing profile exists for the person, the method further involves instructing the bezel display controller to display an indication that no configured viewing profile exists for the person via the two-dimensional LED array. In certain implementations, the method further involves selecting a default viewing profile including default parameters for use to control the display device settings for the display device; automatically adjusting the display device settings for the display device based upon the default viewing profile; and instructing the bezel display controller to display an indication that the default viewing profile has been selected via the two-dimensional LED array. In certain implementations, the method further involves determining that a restriction level is associated with the configured viewing profile for the person; and instructing the bezel display controller to display a restriction identifier via the two-dimensional LED array indicating the restriction level associated with the configured viewing profile. In certain implementations, the method of instructing the bezel display controller to display the restriction identifier via the two-dimensional LED array involves instructing the bezel display controller to display that a content blocking feature of the display device is active. In certain implementations, the method further involves detecting a request to adjust the restriction level associated with the configured viewing profile to an updated restriction level; determining an identity of a person associated with the detected request to adjust the restriction level to the updated restriction level; determining whether the person associated with the detected request to adjust the restriction level has authority to adjust the restriction level to the updated restriction level; upon determining that the person associated with the detected request to adjust the restriction level to the updated restriction level has the authority to adjust the restriction level, assigning the updated restriction level to the configured viewing profile; instructing the bezel display controller to display the updated restriction level via the two-dimensional LED array; and automatically adjusting the display device settings for the display device based upon the assigned updated restriction level of the configured viewing profile. In certain implementations, the method further involves detecting entry of a person other than the person proximate to the display device; determining that the person other than the person proximate to the display device has a restriction level higher than a restriction level of the person proximate to the display device; and instructing the bezel display controller to display a warning via the two-dimensional LED array. In certain implementations, the displayed warning includes text indicating a viewing rating of displayed content and a notice that the person other than the person proximate to the display device has entered. In certain implementations, the displayed warning includes a content rating alert message. In certain implementations, the method of determining the identity of the person proximate to the display device involves performing a biometric analysis of at least one feature of the person. In certain implementations, the method of performing the biometric analysis of the at least one feature of the person involves: determining an identifying characteristic of the person; comparing the identifying characteristic of the person to identifying characteristics stored within a profile database; and determining whether the identifying characteristic of the person exists within the profile database. In certain implementations, upon determining that the identifying characteristic of the person exists within the profile database, the method further involves retrieving the identity of the person proximate to the display device from a profile database record associated with the identifying characteristic of the person within the profile database. In certain implementations, the method of determining the identifying characteristic of the person includes at least one of: receiving a fingerprint scan associated with the person; receiving a facial image scan associated with the person; receiving a pass code associated with the person; and receiving a spectral image from a voice recognition module representative of captured speech of the person. In certain implementations, the method of determining the identifying characteristic of the person involves receiving biometric information from a remote control device associated with the display device. In certain implementations, the method of receiving the biometric information from the remote control device includes at least one of: receiving an image scan of a face of the person; receiving a voice scan of a voice of the person; and receiving a fingerprint scan of the person. In certain implementations, the method of comparing the identifying characteristic of the person to the profile database involves searching the profile database using the identifying characteristic of the person; and the method of determining whether the identifying characteristic of the person exists within the profile database involves determining whether a match exists within the profile database for the identifying characteristic of the person. In certain implementations, the display device includes a television display. In certain implementations, the method further involves instructing the bezel display controller to display, via the two-dimensional LED array, at least one of a user identifier associated with the configured viewing profile, a profile identifier associated with the configured viewing profile, a content rating associated with program material rendered via the television display, a maximum content rating associated with the person via the configured viewing profile, and an advertisement based upon profile preferences for advertising associated with the configured viewing profile.

In another implementation, a computer readable storage medium may store instructions which, when executed on one or more programmed processors, carry out a process of providing user-feedback regarding automated profile selection without obstructing a display area of a display, which involves determining, via an identity profile controller: an identity of a person proximate to a display device; and whether a configured viewing profile exists for the person; and upon determining that the configured viewing profile exists for the person: instructing a bezel display controller to display a profile identifier associated with the configured viewing profile via a two-dimensional light emitting diode (LED) array located within a bezel of the display device outside of the display area of the display; and automatically adjusting display device settings for the display device based upon the configured viewing profile.

An apparatus consistent with anther implementation has a display device having a display including a display area; a two-dimensional light-emitting diode (LED) array located within a bezel of the display device outside of the display area of the display; a bezel display controller configured to provide user-feedback regarding automated profile selection without obstructing the display area of the display; a memory for storing configured viewing profiles; and an identity profile controller configured to: determine: an identity of a person proximate to the display device; and whether a configured viewing profile exists for the person within the memory; and upon determining that the configured viewing profile exists for the person within the memory: instruct the bezel display controller to display a profile identifier associated with the configured viewing profile via the two-dimensional LED array; and automatically adjust display device settings for the display device based upon the configured viewing profile.

In certain implementations, the identity profile controller is further configured to: determine that multiple persons are proximate to the display device; determine whether a configured viewing profile exists for each of the multiple persons proximate to the display device; and upon determining that the configured viewing profile exists for at least two of the multiple persons, determine whether a configured aggregate viewing profile exists for the at least two of the multiple persons. In certain implementations, upon determining that the configured aggregate viewing profile exists for the at least two of the multiple persons, the identity profile controller is further configured to: instruct the bezel display controller to display a profile identifier associated with the configured aggregate viewing profile via the two-dimensional LED array; and automatically adjust device settings based for the display device upon the configured aggregate viewing profile. In certain implementations, upon determining that no configured aggregate viewing profile exists for the at least two of the multiple persons, the identity profile controller is further configured to: create aggregate viewing profile settings based upon the existing configured viewing profile for at least two of the multiple persons; instruct the bezel display controller to display an identification that the aggregate viewing profile has been created via the two-dimensional LED array; and automatically adjust the display device settings for the display device based upon the created aggregate viewing profile. In certain implementations, the memory includes a profile database and the apparatus further has an input device; and the identity profile controller is further configured to: detect a request via the input device to archive the created aggregate viewing profile as a family viewing profile; and store the created aggregate viewing profile as the family viewing profile within the profile database. In certain implementations, upon determining that no configured viewing profile exists for at least at least one of the multiple persons, the identity profile controller is further configured to instruct the bezel display controller to display an indication that no configured viewing profile exists for the at least one of the multiple persons via the two-dimensional LED array. In certain implementations, upon determining that no configured viewing profile exists for the person, the identity profile controller is further configured to instruct the bezel display controller to display an indication that no configured viewing profile exists for the person via the two-dimensional LED array. In certain implementations, the identity profile controller is further configured to: select a default viewing profile including default parameters for use to control the display device settings for the display device; automatically adjust the display device settings for the display device based upon the default viewing profile; and instruct the bezel display controller to display an indication that the default viewing profile has been selected via the two-dimensional LED array. In certain implementations, the identity profile controller is further configured to: determine that a restriction level is associated with the configured viewing profile for the person; and instruct the bezel display controller to display a restriction identifier via the two-dimensional LED array indicating the restriction level associated with the configured viewing profile. In certain implementations, the identity profile controller, in being configured to instruct the bezel display controller to display the restriction identifier via the two-dimensional LED array, is further configured to instruct the bezel display controller to display that a content blocking feature of the display device is active. In certain implementations, the apparatus further has an input device and the identity profile controller is further configured to: detect a request via the input device to adjust the restriction level associated with the configured viewing profile to an updated restriction level; determine an identity of a person associated with the detected request to adjust the restriction level to the updated restriction level; determine whether the person associated with the detected request to adjust the restriction level has authority to adjust the restriction level to the updated restriction level; upon determining that the person associated with the detected request to adjust the restriction level to the updated restriction level has the authority to adjust the restriction level, assign the updated restriction level to the configured viewing profile; instruct the bezel display controller to display the updated restriction level via the two-dimensional LED array; and automatically adjust the display device settings for the display device based upon the assigned updated restriction level of the configured viewing profile. In certain implementations, the identity profile controller is further configured to: detect entry of a person other than the person proximate to the display device; determine that the person other than the person proximate to the display device has a restriction level higher than a restriction level of the person proximate to the display device; and instruct the bezel display controller to display a warning via the two-dimensional LED array. In certain implementations, the displayed warning includes text indicating a viewing rating of displayed content and a notice that the person other than the person proximate to the display device has entered. In certain implementations, the displayed warning includes a content rating alert message. In certain implementations, the identity profile controller, in being configured to determine the identity of the person proximate to the display device, is configured to perform a biometric analysis of at least one feature of the person. In certain implementations, the memory includes a profile database, and the identity profile controller, in being configured to perform the biometric analysis of the at least one feature of the person, is configured to: determine an identifying characteristic of the person; compare the identifying characteristic of the person to identifying characteristics stored within the profile database; and determining whether the identifying characteristic of the person exists within the profile database. In certain implementations, upon determining that the identifying characteristic of the person exists within the profile database, the identity profile controller is further configured to retrieve the identity of the person proximate to the display device from a profile database record associated with the identifying characteristic of the person within the profile database. In certain implementations, the identity profile controller, in being configured to determine the identifying characteristic of the person, is configured to at least one of: receive a fingerprint scan associated with the person; receive a facial image scan associated with the person; receive a pass code associated with the person; and receive a spectral image from a voice recognition module representative of captured speech of the person. In certain implementations, the apparatus has a remote control device associated with the display device; and the identity profile controller, in being configured to determine the identifying characteristic of the person, is configured to receive biometric information from the remote control device. In certain implementations, the identity profile controller, in being configured to receive the biometric information from the remote control device, is configured to at least one of: receive an image scan of a face of the person; receive a voice scan of a voice of the person; and receive a fingerprint scan of the person. In certain implementations, the identity profile controller, in being configured to compare the identifying characteristic of the person to the profile database, is configured to search the profile database using the identifying characteristic of the person; and the identity profile controller, in being configured to determine whether the identifying characteristic of the person exists within the profile database, is configured to determine whether a match exists within the profile database for the identifying characteristic of the person. In certain implementations, the display device includes a television display. In certain implementations, the identity profile controller is further configured to instruct the bezel display controller to display, via the two-dimensional LED array, at least one of a user identifier associated with the configured viewing profile, a profile identifier associated with the configured viewing profile, a content rating associated with program material rendered via the television display, a maximum content rating associated with the person via the configured viewing profile, and an advertisement based upon profile preferences for advertising associated with the configured viewing profile.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable non-transitory electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of providing user-feedback regarding automated profile selection without obstructing a display area of a display device, comprising:
the display device automatically determining that multiple persons are proximate to the display device;
automatically determining, via an identity profile controller:
an identity of each of the multiple persons proximate to the display device; and
whether configured individual viewing profiles exist for at least two of the multiple persons proximate to the display device, where each person is identified individually by a corresponding configured individual viewing profile;
where at least one of the configured individual viewing profiles includes a user configured restriction level corresponding to the at least one configured viewing profile, where the restriction level limits content that can be displayed on the display device when the person corresponding to the configured individual viewing profile is proximate to the display device; and
upon determining that the configured individual viewing profile exists for at least two of the multiple persons:
determining whether a configured aggregate viewing profile, including a restriction level, exists for the at least two of the multiple persons:
instructing a bezel display controller to display a profile identifier associated with the configured aggregate viewing profile via a two-dimensional light emitting diode (LED) array located within a bezel of the display device outside of the display area of the display; and
automatically adjusting a display device setting that controls operational behavior of the display device based upon the configured aggregate viewing profile.

2. The method according to claim 1, further comprising, upon determining that no configured aggregate viewing profile exists for the at least two of the multiple persons:
creating aggregate viewing profile settings based upon the existing configured viewing profile for at least two of the multiple persons;
instructing the bezel display controller to display an identification that the aggregate viewing profile has been created via the two-dimensional LED array; and
automatically adjusting the display device settings for the display device based upon the created aggregate viewing profile.

3. The method according to claim 2, further comprising:
detecting a request via an input device to archive the created aggregate viewing profile as a family viewing profile; and
storing the created aggregate viewing profile as the family viewing profile within a profile database.

4. The method of claim 1, where upon determining that no configured viewing profile exists for at least at least one of the multiple persons, instructing the bezel display controller to display an indication that no configured viewing profile exists for the at least one of the multiple persons via the two-dimensional LED array.

5. The method according to claim 1, further comprising, upon determining that no configured viewing profile exists for the person, instructing the bezel display controller to display an indication that no configured viewing profile exists for the person via the two-dimensional LED array.

6. The method according to claim 5, further comprising:
selecting a default viewing profile comprising default parameters for use to control the display device settings for the display device;
automatically adjusting the display device settings for the display device based upon the default viewing profile; and
instructing the bezel display controller to display an indication that the default viewing profile has been selected via the two-dimensional LED array.

7. The method according to claim 1, further comprising:
Determining the restriction level associated with the configured aggregate viewing profile; and
instructing the bezel display controller to display a restriction identifier via the two-dimensional LED array indicating the restriction level associated with the configured aggregate viewing profile.

8. The method according to claim 7, where instructing the bezel display controller to display the restriction identifier via the two-dimensional LED array comprises instructing the bezel display controller to display that a content blocking feature of the display device is active.

9. The method according to claim 8, further comprising:
detecting a request to adjust the restriction level associated with the configured viewing profile to an updated restriction level;
determining an identity of a person associated with the detected request to adjust the restriction level to the updated restriction level;
determining whether the person associated with the detected request to adjust the restriction level has authority to adjust the restriction level to the updated restriction level;
upon determining that the person associated with the detected request to adjust the restriction level to the updated restriction level has the authority to adjust the restriction level, assigning the updated restriction level to the configured viewing profile;
instructing the bezel display controller to display the updated restriction level via the two-dimensional LED array; and
automatically adjusting the display device settings for the display device based upon the assigned updated restriction level of the configured viewing profile.

10. The method according to claim 1, further comprising:
detecting entry of a person other than the multiple persons proximate to the display device;
determining that the person other than the multiple persons proximate to the display device has a restriction level higher than a restriction level of the person proximate to the display device; and
instructing the bezel display controller to display a warning via the two-dimensional LED array.

11. The method according to claim 10, where the displayed warning comprises text indicating a viewing rating of displayed content and a notice that the person other than the person proximate to the display device has entered.

12. The method according to claim 10, where the displayed warning comprises a content rating alert message.

13. The method according to claim 1, where determining the identity of the multiple persons proximate to the display device comprises performing a biometric analysis of at least one feature of each of the multiple persons.

14. The method according to claim 13, where performing the biometric analysis of the at least one feature of each of the persons comprises:
   determining an identifying characteristic of the person;
   comparing the identifying characteristic of the person to identifying characteristics stored within a profile database; and
   determining whether the identifying characteristic of the person exists within the profile database.

15. The method according to claim 14, where, upon determining that the identifying characteristic of each of the persons exists within the profile database, retrieving the identity of each person proximate to the display device from a profile database record associated with the identifying characteristic of the person within the profile database.

16. The method according to claim 14, where determining the identifying characteristic of the person comprises at least one of:
   receiving a fingerprint scan associated with the person;
   receiving a facial image scan associated with the person;
   receiving a pass code associated with the person; and
   receiving a spectral image from a voice recognition module representative of captured speech of the person.

17. The method according to claim 14, where determining the identifying characteristic of the person comprises receiving biometric information from a remote control device associated with the display device.

18. The method according to claim 17, where receiving the biometric information from the remote control device comprises at least one of:
   receiving an image scan of a face of the person;
   receiving a voice scan of a voice of the person; and
   receiving a fingerprint scan of the person.

19. The method according to claim 14, where:
   comparing the identifying characteristic of the person to the profile database comprises searching the profile database using the identifying characteristic of the person; and
   determining whether the identifying characteristic of the person exists within the profile database comprises determining whether a match exists within the profile database for the identifying characteristic of the person.

20. The method according to claim 1, where the display device comprises a television display.

21. The method according to claim 20, further comprising instructing the bezel display controller to display, via the two-dimensional LED array, at least one of a user identifier associated with the configured viewing profile, a profile identifier associated with the configured viewing profile, a content rating associated with program material rendered via the television display, a maximum content rating associated with the person via the configured viewing profile, and an advertisement based upon profile preferences for advertising associated with the configured viewing profile.

22. The apparatus according to claim 1, where the display device settings comprise at least one of video display operational characteristics or audio operational characteristics or maximum content rating.

23. A non-transitory computer readable storage medium storing instructions which, when executed on one or more programmed processors, carry out a method according to claim 1.

24. An apparatus, comprising:
   a display device having a display comprising a display area;
   a two-dimensional light-emitting diode (LED) array located within a bezel of the display device outside of the display area of the display;
   a bezel display controller configured to provide user-feedback regarding automated profile selection without obstructing the display area of the display;
   a memory for storing configured viewing profiles comprising configured individual viewing profiles corresponding to individual persons, where the configured individual viewing profiles includes a user configured restriction level that limits content that can be displayed to the individual person on the display device;
   a sensor configured to automatically determine that multiple persons are proximate to the display device; and
   an identity profile controller configured to:
      automatically determine:
         an identity of each person proximate to the display device; and
         whether a configured viewing profile exists for each person within the memory; and
      upon determining that the configured individual viewing profile exists for at least two of the multiple persons within the memory:
         determine whether a configured aggregate viewing profile exists for the at least two of the multiple persons;
         instruct the bezel display controller to display a profile identifier associated with the configured aggregate viewing profile via the two-dimensional LED array; and
         automatically adjust a display device setting that controls operational behavior of the display device based upon the configured aggregate viewing profile.

25. The apparatus according to claim 24, where upon determining that no configured aggregate viewing profile exists for the at least two of the multiple persons, the identity profile controller is further configured to:
   create aggregate viewing profile settings based upon the existing configured individual viewing profile for at least two of the multiple persons;
   instruct the bezel display controller to display an identification that the aggregate viewing profile has been created via the two-dimensional LED array; and
   automatically adjust the display device settings for the display device based upon the created aggregate viewing profile.

26. The apparatus according to claim 25, where the memory comprises a profile database and further comprising:
   an input device; and
   where the identity profile controller is further configured to:
      detect a request via the input device to archive the created aggregate viewing profile as a family viewing profile; and store the created aggregate viewing profile as the family viewing profile within the profile database.

27. The apparatus of claim 24, where upon determining that no configured viewing profile exists for at least at least one of the multiple persons, the identity profile controller is further configured to instruct the bezel display controller to display an indication that no configured viewing profile exists for the at least one of the multiple persons via the two-dimensional LED array.

28. The apparatus according to claim 24, where upon determining that no configured viewing profile exists for the multiple persons, the identity profile controller is further configured to instruct the bezel display controller to display an indication that no configured viewing profile exists for the person via the two-dimensional LED array.

29. The method according to claim 28, where the identity profile controller is further configured to:
select a default viewing profile comprising default parameters for use to control the display device settings for the display device;
automatically adjust the display device settings for the display device based upon the default viewing profile; and
instruct the bezel display controller to display an indication that the default viewing profile has been selected via the two-dimensional LED array.

30. The apparatus according to claim 24, where the identity profile controller is further configured to:
Determine the restriction level associated with the configured aggregate viewing profile; and
instruct the bezel display controller to display a restriction identifier via the two-dimensional LED array indicating the restriction level associated with the configured viewing profile.

31. The apparatus according to claim 30, where, in being configured to instruct the bezel display controller to display the restriction identifier via the two-dimensional LED array, the identity profile controller is further configured to instruct the bezel display controller to display that a content blocking feature of the display device is active.

32. The apparatus according to claim 31, further comprising an input device and where the identity profile controller is further configured to:
detect a request via the input device to adjust the restriction level associated with the configured viewing profile to an updated restriction level;
determine an identity of a person associated with the detected request to adjust the restriction level to the updated restriction level;
determine whether the person associated with the detected request to adjust the restriction level has authority to adjust the restriction level to the updated restriction level;
upon determining that the person associated with the detected request to adjust the restriction level to the updated restriction level has the authority to adjust the restriction level, assign the updated restriction level to the configured viewing profile;
instruct the bezel display controller to display the updated restriction level via the two-dimensional LED array; and
automatically adjust the display device settings for the display device based upon the assigned updated restriction level of the configured viewing profile.

33. The apparatus according to claim 24, where the identity profile controller is further configured to:
detect entry of a person other than the multiple persons proximate to the display device;
determine that the person other than the multiple persons proximate to the display device has a restriction level higher than a restriction level of the multiple persons proximate to the display device; and
instruct the bezel display controller to display a warning via the two-dimensional LED array.

34. The apparatus according to claim 33, where the displayed warning comprises text indicating a viewing rating of displayed content and a notice that the person other than the person proximate to the display device has entered.

35. The apparatus according to claim 33, where the displayed warning comprises a content rating alert message.

36. The apparatus according to claim 24, where, in being configured to determine the identity of each person proximate to the display device, the identity profile controller is configured to perform a biometric analysis of at least one feature of the person.

37. The apparatus according to claim 36, where the memory comprises a profile database and where, in being configured to perform the biometric analysis of the at least one feature of the person, the identity profile controller is configured to:
determine an identifying characteristic of the person;
compare the identifying characteristic of the person to identifying characteristics stored within the profile database; and
determine whether the identifying characteristic of the person exists within the profile database.

38. The apparatus according to claim 37, where, upon determining that the identifying characteristic of the person exists within the profile database, the identity profile controller is further configured to retrieve the identity of the person proximate to the display device from a profile database record associated with the identifying characteristic of the person within the profile database.

39. The apparatus according to claim 37, where, in being configured to determine the identifying characteristic of the person, the identity profile controller is configured to at least one of:
receive a fingerprint scan associated with the person;
receive a facial image scan associated with the person;
receive a pass code associated with the person; and
receive a spectral image from a voice recognition module representative of captured speech of the person.

40. The apparatus according to claim 37, further comprising:
a remote control device associated with the display device; and
where, in being configured to determine the identifying characteristic of the person, the identity profile controller is configured to receive biometric information from the remote control device.

41. The apparatus according to claim 40, where, in being configured to receive the biometric information from the remote control device, the identity profile controller is configured to at least one of:
receive an image scan of a face of the person;
receive a voice scan of a voice of the person; and
receive a fingerprint scan of the person.

42. The apparatus according to claim 37, where:
in being configured to compare the identifying characteristic of the person to the profile database, the identity profile controller is configured to search the profile database using the identifying characteristic of the person; and
in being configured to determine whether the identifying characteristic of the person exists within the profile database, the identity profile controller is configured to determine whether a match exists within the profile database for the identifying characteristic of the person.

43. The apparatus according to claim 24, where the display device comprises a television display.

44. The apparatus according to claim 43, where the identity profile controller is further configured to instruct the bezel display controller to display, via the two-dimensional LED array, at least one of a user identifier associated with the configured viewing profile, a profile identifier associated with the configured viewing profile, a content rating associated with program material rendered via the television display, a maximum content rating associated with the person via the configured viewing profile, and an advertisement based upon profile preferences for advertising associated with the configured viewing profile.

45. The apparatus according to claim 24, where the display device settings comprise at least one of video display operational characteristics or audio operational characteristics or maximum content rating.

46. An apparatus, comprising:
   a television having a display comprising a display area;
   a two-dimensional light-emitting diode (LED) array located within a bezel of the television outside of the display area;
   a bezel display controller configured to provide user-feedback regarding automated profile selection without obstructing the display area of the display;
   a memory for storing configured viewing profiles comprising configured individual viewing profiles corresponding to individual persons, where the configured individual viewing profiles includes a user configured restriction level that limits content that can be displayed to the individual person on the display device;
   a camera configured to automatically determine that multiple persons are proximate to the display device; and
   an identity profile controller configured to:
     automatically determine:
       an identity of each the person proximate to the display device by facial recognition; and
       whether a configured individual viewing profile exists for each person within the memory; and
     upon determining that the configured viewing profile exists for at least two of the multiple persons within the memory:
       determine whether a configured aggregate viewing profile having a restriction level exists for the at least two of the multiple persons;
       instruct the bezel display controller to display a profile identifier associated with the configured aggregate viewing profile via the two-dimensional LED array; and
       automatically adjust display device settings that control maximum content rating of the television display device based upon the configured aggregate viewing profile's restriction level.

* * * * *